US011966198B2

(12) United States Patent
Charbon

(10) Patent No.: US 11,966,198 B2
(45) Date of Patent: *Apr. 23, 2024

(54) SPIRAL SPRING FOR CLOCK OR WATCH MOVEMENT AND METHOD OF MANUFACTURE THEREOF

(71) Applicant: Nivarox-FAR S.A., Le Locle (CH)

(72) Inventor: Christian Charbon, Chezard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,228

(22) Filed: Nov. 30, 2022

(65) Prior Publication Data

US 2023/0088320 A1 Mar. 23, 2023

Related U.S. Application Data

(63) Continuation of application No. 16/143,764, filed on Sep. 27, 2018, now Pat. No. 11,586,146.

(30) Foreign Application Priority Data

Dec. 21, 2017 (EP) .................................... 17209682

(51) Int. Cl.

| | |
|---|---|
| ***G04B 17/06*** | (2006.01) |
| ***C22C 27/02*** | (2006.01) |
| ***C22F 1/00*** | (2006.01) |
| ***C22F 1/18*** | (2006.01) |
| *C22C 14/00* | (2006.01) |

(52) U.S. Cl.

CPC ............ *G04B 17/066* (2013.01); *C22C 27/02* (2013.01); *C22F 1/00* (2013.01); *C22F 1/18* (2013.01); *G04B 17/06* (2013.01); *C22C 14/00* (2013.01)

(58) Field of Classification Search

None

See application file for complete search history.

(56) References Cited

U.S. PATENT DOCUMENTS

| | | | |
|---|---|---|---|
| 6,402,859 B1 | 6/2002 | Ishii et al. | |
| 6,607,693 B1 | 8/2003 | Saito et al. | |
| 2002/0174922 A1 | 11/2002 | Ishii et al. | |
| 2002/0180130 A1 | 12/2002 | Baur et al. | |
| 2007/0133355 A1 | 6/2007 | Hara et al. | |

FOREIGN PATENT DOCUMENTS

| | | |
|---|---|---|
| EP | 1 083 243 A2 | 3/2001 |
| EP | 1 114 876 A1 | 7/2001 |
| EP | 1 258 786 A1 | 11/2002 |
| EP | 1 352 978 B1 | 5/2009 |
| EP | 2 696 381 A1 | 2/2014 |
| GB | 1166701 | 10/1969 |
| JP | 2005-140674 A | 6/2005 |
| WO | WO 2005/045532 A2 | 5/2005 |
| WO | WO 2015/189278 A2 | 12/2015 |

OTHER PUBLICATIONS

European Search Report dated Jun. 22, 2018 in European Application 17209682.8, filed on Dec. 21, 2017 (with English Translation of Categories of cited documents).

Combined Chinese Office Action and Search Report dated Jun. 29, 2020, in Patent Application No. 201811412811.7 (with English translation), 12 pages.

Zeng Liying, et al. "Progress in High Strength Titanium Alloys for Springs" Titanium Industry Progress, vol. 26, No. 5, Oct. 31, 2009, pp. 5-9 (with partial translation).

Office Action dated Feb. 16, 2021 in corresponding Indian Patent Application No. 201844047602 (with English Translation), 6 pages.

Notice of the Reason for Refusal dated Dec. 20, 2022 in Japanese Patent Application No. 2020-130704 (with English translation), 7 pages.

"Data Book of Metals," The Japan Institute of Metals and Materials, Third edition, Mar. 25, 1993, 4 pages (with partial English language translation).

*Primary Examiner* — Xiaobei Wang

(74) *Attorney, Agent, or Firm* — Oblon, McClelland, Maier & Neustadt, L.L.P.

(57) ABSTRACT

The present invention relates to a spiral spring for a balance wheel made of an alloy of niobium and titanium with an essentially single-phase structure, and the method of manufacture thereof which comprises:

a step of producing a blank in a niobium-based alloy consisting of:
niobium: balance to 100 wt %,
titanium: between 40 and 49 wt %,
traces of elements selected from the group consisting of O, H, C, Fe, Ta, N, Ni, Si, Cu, Al, between 0 and 1600 ppm by weight individually, and cumulatively less than 0.3 wt %, a step of type β hardening of said blank at a given diameter, in such a way that the titanium of the niobium-based alloy is essentially in the form of a solid solution with niobium in β phase, the content of titanium in α phase being less than or equal to 10 vol %, at least one deformation step of said alloy alternating with at least one step of heat treatment, the number of steps of heat treatment and of deformation being limited so that the niobium-based alloy obtained retains a structure in which the titanium of the niobium-based alloy is essentially in the form of a solid solution with niobium in β phase, the content of titanium in α phase being less than or equal to 10 vol % and it has an elastic limit greater than or equal to 600 MPa and an elastic modulus less than or equal to 100 GPa, a step of winding to form the spiral spring being carried out before the last heat treatment step.

18 Claims, No Drawings

SPIRAL SPRING FOR CLOCK OR WATCH MOVEMENT AND METHOD OF MANUFACTURE THEREOF

This application is a continuation of U.S. patent application Ser. No. 16/143,764 filed on Sep. 27, 2018, and claims priority from European patent application No. 17209682.8 filed on Dec. 21, 2017, the entire disclosures of both of which are hereby incorporated herein by reference.

FIELD OF THE INVENTION

The invention relates to a spiral spring intended to equip a balance wheel of a clock or watch movement, as well as a method of manufacturing a spiral spring of this kind.

BACKGROUND OF THE INVENTION

The manufacture of spiral springs for clocks and watches must cope with constraints that are often incompatible at first sight:

- need to obtain a high elastic limit,
- ease of production, notably of wiredrawing and rolling,
- excellent fatigue strength,
- stable performance over time,
- small cross-sections.

Moreover, a key concern in the production of spiral springs is thermal compensation, so as to guarantee regular chronometric performance. For this it is necessary to obtain a thermoelastic coefficient close to zero. A further aim is to produce spiral springs that have limited sensitivity to magnetic fields.

Any improvement of at least one of these points, and in particular limited sensitivity to magnetic fields and thermal compensation, therefore represents a significant advance.

SUMMARY OF THE INVENTION

The invention proposes to define a new type of spiral spring intended to equip a balance wheel of a clock or watch movement, based on selecting a particular material, and elaborating a suitable method of manufacture.

For this purpose, the invention relates to a spiral spring intended to equip a balance wheel of a clock or watch movement, the spiral spring being made of a niobium-based alloy consisting of:

- niobium: balance to 100 wt %,
- titanium: between 40 and 49 wt %,
- traces of elements selected from the group consisting of O, H, C, Fe, Ta, N, Ni, Si, Cu, Al, each of said elements being present in an amount between 0 and 1600 ppm by weight, the total amount representing all of said elements being between 0% and 0.3 wt %, and in which titanium is essentially in the form of a solid solution with niobium in β phase (centred cubic structure), the content of titanium in α phase (compact hexagonal structure) being less than or equal to 10 vol %, said alloy having an elastic limit greater than or equal to 600 MPa and an elastic modulus below 100 GPa.

The present invention also relates to a method of manufacturing a spiral spring of this kind which comprises:

- a step of producing a blank in a niobium-based alloy consisting of:
  - niobium: balance to 100 wt %,
  - titanium: between 40 and 49 wt %,
  - traces of elements selected from the group consisting of O, H, C, Fe, Ta, N, Ni, Si, Cu, Al, each of said elements being present in an amount between 0 and 1600 ppm by weight, the total amount representing all of said elements being between 0% and 0.3 wt %,
- a step of type β hardening of said blank at a given diameter, in such a way that the titanium of the niobium-based alloy is essentially in the form of a solid solution with niobium in β phase, the content of titanium in α phase being less than or equal to 5 vol %,
- at least one deformation step of said alloy alternating with at least one step of heat treatment, the number of steps of heat treatment and of deformation being limited so that the niobium-based alloy obtained retains a structure in which the titanium of the niobium-based alloy is essentially in the form of a solid solution with niobium in β phase, the content of titanium in α phase being less than or equal to 10 vol % and it has an elastic limit greater than or equal to 600 MPa and an elastic modulus less than or equal to 100 GPa, a step of winding to form the spiral spring being carried out before the last heat treatment step.

The spiral spring according to the invention is made of a niobium-based alloy having an essentially single-phase structure, is paramagnetic and has the mechanical properties and the thermoelastic coefficient required for use thereof as a spiral spring for a balance wheel. It is obtained by a method of manufacture that is simple to implement, allowing easy forming and adjustment of the thermal compensation, in just a few steps.

DETAILED DESCRIPTION OF PREFERRED EMBODIMENTS

The invention relates to a spiral spring intended to equip a balance wheel of a clock or watch movement and made of an alloy of the binary type comprising niobium and titanium.

According to the invention, the spiral spring is made of a niobium-based alloy consisting of:

- niobium: balance to 100 wt %,
- titanium: between 40 and 49 wt %,
- traces of elements selected from the group consisting of O, H, C, Fe, Ta, N, Ni, Si, Cu, Al, each of said elements being present in an amount between 0 and 1600 ppm by weight, the total amount representing all of said elements being between 0 and 0.3 wt %, and in which titanium is essentially in the form of a solid solution with niobium in β phase, the content of titanium in α phase being less than or equal to 10 vol %.

Thus, the spiral spring according to the invention is made of an NbTi alloy having an essentially single-phase structure in the form of β-Nb—Ti solid solution, the content of titanium in the α form being less than or equal to 10 vol %.

The content of titanium in the α form is preferably less than or equal to 5 vol %, and more preferably less than or equal to 2.5 vol %.

Advantageously, the alloy used in the present invention comprises between 44% and 49 wt % of titanium, preferably between 46% and 48 wt % of titanium, and preferably said alloy comprises more than 46.5 wt % of titanium and said alloy comprises less than 47.5 wt % of titanium.

If the level of titanium is too high, a martensitic phase appears, leading to problems of brittleness of the alloy when in use. If the level of niobium is too high, the alloy will be too soft. Development of the invention made it possible to determine a compromise, with an optimum between these two characteristics close to 47 wt % of titanium.

Thus, more particularly, the titanium content is greater than or equal to 46.5 wt % relative to the total composition.

More particularly, the titanium content is less than or equal to 47.5 wt % relative to the total composition.

Particularly advantageously, the NbTi alloy used in the present invention does not comprise other elements except any unavoidable traces. This makes it possible to avoid the formation of brittle phases.

More particularly, the oxygen content is less than or equal to 0.10 wt % of the total, or even less than or equal to 0.085 wt % of the total.

More particularly, the tantalum content is less than or equal to 0.10 wt % of the total.

More particularly, the carbon content is less than or equal to 0.04 wt % of the total, notably less than or equal to 0.020 wt % of the total, or even less than or equal to 0.0175 wt % of the total.

More particularly, the iron content is less than or equal to 0.03 wt % of the total, notably less than or equal to 0.025 wt % of the total, or even less than or equal to 0.020 wt % of the total.

More particularly, the nitrogen content is less than or equal to 0.02 wt % of the total, notably less than or equal to 0.015 wt % of the total, or even less than or equal to 0.0075 wt % of the total.

More particularly, the hydrogen content is less than or equal to 0.01 wt % of the total, notably less than or equal to 0.0035 wt % of the total, or even less than or equal to 0.0005 wt % of the total.

More particularly, the silicon content is less than or equal to 0.01 wt % of the total.

More particularly, the nickel content is less than or equal to 0.01 wt % of the total, notably less than or equal to 0.16 wt % of the total.

More particularly, the content of ductile material, such as copper, in the alloy is less than or equal to 0.01 wt % of the total, notably less than or equal to 0.005 wt % of the total.

More particularly, the content of aluminium is less than or equal to 0.01 wt % of the total.

The spiral spring of the invention has an elastic limit greater than or equal to 600 MPa.

Advantageously, this spiral spring has an elastic modulus less than or equal to 100 GPa, and preferably between 60 GPa and 80 GPa.

Furthermore, the spiral spring according to the invention has a thermoelastic coefficient, also called TEC, enabling it to guarantee maintenance of the chronometric performance despite variation of the temperatures of use of a watch incorporating a spiral spring of this kind.

To form a chronometric oscillator meeting the COSC conditions, the TEC of the alloy must be close to zero (±10 ppm/° C.) to obtain a thermal coefficient of the oscillator equal to ±0.6 s/j/° C.

The formula linking the TEC of the alloy and the coefficients of expansion of the spiral and of the balance wheel is as follows:

$$CT = \frac{dM}{dT} = \left(\frac{1}{2E}\frac{dE}{dT} - \beta + \frac{3}{2}\alpha\right) \times 86400 \frac{s}{j^{\circ}\,C.}$$

The variables M and T are respectively the rate and the temperature. E is the Young's modulus of the spiral spring, and in this formula E, β and α are expressed in ° $C.^{-1}$.

CT is the thermal coefficient of the oscillator, (1/E. dE/dT) is the TEC of the spiral alloy, β is the coefficient of expansion of the balance wheel and a that of the spiral.

A suitable TEC and therefore a suitable CT are easily obtained during application of the various steps of the method of the invention, as will be seen below.

The present invention also relates to a method of manufacturing a spiral spring in alloy of the NbTi binary type as defined above, said method comprising:

- a step of producing a blank in a niobium-based alloy consisting of:
  - niobium: balance to 100 wt %,
  - titanium: between 40 and 49 wt %,
  - traces of elements selected from the group consisting of O, H, C, Fe, Ta, N, Ni, Si, Cu, Al, each of said elements being present in an amount between 0 and 1600 ppm by weight, the total amount representing all of said elements being between 0 and 0.3 wt %,
- a step of type β hardening of said blank at a given diameter, in such a way that the titanium of the niobium-based alloy is essentially in the form of a solid solution with niobium in β phase, the content of titanium in α phase being less than or equal to 5 vol %,
- at least one step of deformation of said alloy alternating with at least one step of heat treatment, the number of steps of heat treatment and of deformation being limited so that the niobium-based alloy obtained retains an essentially single-phase structure in which the titanium of the niobium-based alloy is essentially in the form of a solid solution with niobium in β phase, the content of titanium in α phase being less than or equal to 10 vol % and it has an elastic limit greater than or equal to 600 MPa and an elastic modulus less than or equal to 100 GPa, a step of winding to form the spiral spring being carried out before the last heat treatment step, said last step making it possible to fix the shape of the spiral and adjust the thermoelastic coefficient.

More particularly, the β hardening step is a solution treatment, with a duration between 5 minutes and 2 hours at a temperature between 700° C. and 1000° C., under vacuum, followed by cooling under gas.

Even more particularly, this beta hardening is a solution treatment, for between 5 minutes and 1 hour at 800° C. under vacuum, followed by cooling under gas.

Preferably, the heat treatment is carried out for a time between 1 hour and 15 hours at a temperature between 350° C. and 700° C. More preferably, the heat treatment is carried out for a time between 5 hours and 10 hours at a temperature between 350° C. and 600° C. Even more preferably, the heat treatment is carried out for a time between 3 hours and 6 hours at a temperature between 400° C. and 500° C.

A deformation step denotes in an overall manner one or more deformation treatments, which may comprise wiredrawing and/or rolling. Wiredrawing may require the use of one or more dies during the same deformation step or during different deformation steps if necessary. Wiredrawing is carried out until a wire of round section is obtained. Rolling may be carried out during the same deformation step as the wiredrawing or in another subsequent deformation step. Advantageously, the last deformation treatment applied to the alloy is rolling, preferably to a rectangular profile compatible with the entrance cross-section of a winding pin.

Advantageously, the total degree of deformation is between 1 and 5, preferably between 2 and 5. This degree of deformation corresponds to the classical formula 2 ln(d0/d), where d0 is the diameter of the last beta hardening, and where d is the diameter of the work-hardened wire.

Particularly advantageously, a blank is used whose dimensions are closest to the required final dimensions so as to limit the number of steps of heat treatment and deformation and preserve an essentially single-phase β structure of the NbTi alloy. The final structure of the NbTi alloy of the spiral spring may be different from the initial structure of the blank, for example the content of titanium in the α form may have changed, the essential point being that the final structure of the NbTi alloy of the spiral spring is essentially single-phase, the titanium of the niobium-based alloy being essentially in the form of a solid solution with niobium in β phase, the content of titanium in α phase being less than or equal to 10 vol %, preferably less than or equal to 5 vol %, more preferably less than or equal to 2.5 vol %. In the alloy of the blank after β hardening, the content of titanium in α phase is preferably less than or equal to 5 vol %, more preferably less than or equal to 2.5 vol %, or even close to or equal to 0.

Thus, preferably, the method of the invention comprises a single deformation step with a degree of deformation between 1 and 5, preferably between 2 and 5. The degree of deformation corresponds to the classical formula 2 ln(d0/d), where d0 is the diameter of the last beta hardening or of that of a deformation step, and d is the diameter of the work-hardened wire obtained in the next deformation step.

Thus, a particularly preferred method of the invention comprises, after the β hardening step, a deformation step including wiredrawing by means of several dies and then rolling, a step of winding and then a last step of heat treatment (called fixing).

The method of the invention may further comprise at least one step of intermediate heat treatment, so that the method comprises for example after the β hardening step, a first deformation step, a step of intermediate heat treatment, a second deformation step, the winding step and then a last heat treatment step.

Particularly advantageously, the total degree of deformation obtained after several steps of deformation, and preferably by a single deformation step, the number of heat treatments as well as the parameters of the heat treatments are selected to obtain a spiral spring having a thermoelastic coefficient as close as possible to 0.

The higher the degree of deformation after β hardening, the more the thermal coefficient CT is positive. The more the material is annealed after β hardening, in the appropriate temperature range, by the different heat treatments, the more the thermal coefficient CT becomes negative. An appropriate choice of the degree of deformation and of the parameters of the heat treatments makes it possible to bring the single-phase NbTi alloy to a TEC close to zero, which is particularly favourable.

Advantageously, the method of the invention further comprises, before the deformation step, and more particularly before wiredrawing, a step of depositing, on the alloy blank, a surface layer of a ductile material selected from the group comprising copper, nickel, cupro-nickel, cupro-manganese, gold, silver, nickel-phosphorus Ni—P and nickel-boron Ni—B, to facilitate forming in the form of wire.

The ductile material, preferably copper, is thus deposited at a given moment to facilitate forming of the wire by stretching and wiredrawing, in such a way that a thickness thereof preferably between 1 and 500 micrometres remains on the wire with a total diameter from 0.2 to 1 millimetre.

The ductile material, notably copper, may be supplied by electroplating, PVD or CVD, or else by mechanical means, and it is then a jacket or a tube of ductile material such as copper that is fitted on a bar of niobium-titanium alloy at a large diameter, which is then made thinner during the step or steps of deformation of the composite bar.

Advantageously, the thickness of the layer of ductile material deposited is selected so that the ratio of the area of ductile material to the area of NbTi for a given section of wire is below 1, preferably below 0.5, and more preferably between 0.01 and 0.4.

This thickness of ductile material, and notably of copper, allows the Cu/NbTi composite material to be rolled easily.

According to a first variant, the method of the invention may comprise, after the deformation step, a step of removing said surface layer of ductile material. Preferably, the ductile material is removed once all the operations of deformation treatment have been carried out, i.e. after the last rolling, before winding.

Preferably, the layer of ductile material, such as copper, is removed from the wire notably by etching, with a solution based on cyanides or based on acids, for example nitric acid.

According to another variant of the method of the invention, the surface layer of ductile material is kept on the spiral spring, the thermoelastic coefficient of the niobium-based alloy being adapted in consequence so as to compensate the effect of the ductile material. As we saw above, the thermoelastic coefficient of the niobium-based alloy may easily be adjusted by selecting the appropriate degree of deformation and heat treatments. The preserved surface layer of ductile material makes it possible to obtain a final wire cross-section that is perfectly regular. The ductile material may in this case be copper or gold, deposited by electroplating, PVD or CVD.

The method of the invention may further comprise a step of depositing, on the preserved surface layer of ductile material, a final layer of a material selected from the group comprising $Al_2O_3$, $TiO_2$, $SiO_2$ and AlO, by PVD or CVD. A final layer of flash-deposited gold or electroplated gold may also be provided if gold has not already been used as the ductile material of the surface layer. It is also possible to use copper, nickel, cupro-nickel, cupro-manganese, silver, nickel-phosphorus Ni—P and nickel-boron Ni—B for the final layer, provided the material of the final layer is different from the ductile material of the surface layer.

This final layer has a thickness from 0.1 μm to 1 μm and makes it possible to colour the spiral or obtain insensitivity to climatic ageing (temperature and humidity).

The invention thus makes it possible to produce a spiral spring for a balance wheel in alloy of the niobium-titanium type, typically with 47 wt % of titanium (40-49%). With a limited number of steps of deformation and heat treatment, it is possible to obtain an essentially single-phase microstructure of β-Nb—Ti in which titanium is in the β form. This alloy has high mechanical properties, combining a very high elastic limit, above 600 MPa, and a very low elastic modulus, of the order of 60 GPa to 80 GPa. This combination of properties is very suitable for a spiral spring.

Such an alloy is known and is used for making superconductors, such as magnetic resonance imaging equipment, or particle accelerators, but is not used in clock and watch making.

An alloy of the binary type comprising niobium and titanium, of the type selected above for carrying out the invention, also has an effect similar to that of "Elinvar", with a practically zero thermoelastic coefficient in the usual temperature range of use of watches, and suitable for making self-compensating springs.

Moreover, such an alloy is paramagnetic.

Furthermore, such an alloy makes it possible to manufacture a spiral spring by a simple method of manufacture, comprising few steps, allowing easy forming and adjustment of the thermal compensation. In fact, this alloy of the niobium-titanium type can easily be covered with ductile material, such as copper, which greatly facilitates its deformation by wiredrawing.

Moreover, an appropriate choice of the degree of deformation and a limited number of simple heat treatments allows easy adjustment of the thermoelastic coefficient of the alloy.

The present invention will now be illustrated in more detail by the following non-limiting example.

A spiral was manufactured by the method of the invention starting from a wire of a given diameter in niobium-based alloy consisting of 53 wt % of niobium and 47 wt % of titanium that had undergone a step of β type hardening so that the titanium is essentially in the form of a solid solution with the niobium in β phase.

According to the method of the invention, the wire undergoes a first deformation step (wiredrawing), a step of intermediate heat treatment, a second deformation step (wiredrawing and rolling), the winding step and then the last step of heat treatment corresponding to the fixing of the spiral.

The spiral is coupled to a cupro-beryllium balance wheel and the thermal coefficient CT of the oscillator thus obtained is measured.

The results are shown in the following table:

| Ex. | Diameter after β hardening (mm) | Intermediate heat treatment | Diameter after intermediate heat treatment (mm) | Fixing | Final diameter (mm) | CT (s/j/° C.) |
|---|---|---|---|---|---|---|
| 1 | 2.0 | 450° C./10 h | 0.7 | 450° C./ 10 h | 0.1 | +0.42 |

This example demonstrates that an appropriate choice of the degree of deformation and a limited number of simple heat treatments allows easy adjustment of the thermoelastic coefficient of the alloy.

What is claimed is:

1. A spiral spring comprising a niobium-based alloy consisting of:

niobium: balance to 100 wt %;

titanium: from 40 wt % to 49 wt %; and traces of elements selected from the group consisting of O, H, C, Fe, Ta, N, Ni, Si, Cu, and Al, wherein each of the elements is present in an amount between 0 ppm and 1600 ppm by weight, and the total amount representing all of the elements is between 0 wt % and 0.3 wt %, wherein the titanium is essentially in the form of a solid solution with the niobium in β phase, and the content of titanium in a phase is 5 vol % or less, the niobium-based alloy has an elastic limit of at least 600 MPa and an elastic modulus of less than 100 GPa, and the spiral spring does not comprise a surface layer of a ductile material selected from the group consisting of copper, nickel, cupro-nickel, cupro-manganese, gold, silver, nickel phosphorus Ni—P and nickel-boron Ni—B.

2. The spiral spring according to claim 1, wherein the niobium-based alloy comprises from 44 wt % to 49 wt % of titanium.

3. The spiral spring according to claim 2, wherein the niobium-based alloy comprises from 46 wt % to 48 wt % of titanium.

4. The spiral spring according to claim 1, wherein the niobium-based alloy comprises from more than 46.5 wt % to 48 wt % of titanium.

5. The spiral spring according to claim 1, wherein the niobium-based alloy comprises from 44 wt % to less than 47.5 wt % of titanium.

6. A method of manufacturing a spiral spring according to claim 1, the method comprising:

producing a blank of a niobium-based alloy consisting of:

niobium: balance to 100 wt %;

titanium: from 40 wt % to 49 wt %; and traces of elements selected from the group consisting of O, H, C, Fe, Ta, N, Ni, Si, Cu, and Al, wherein each of the elements is present in an amount between 0 ppm and 1600 ppm by weight, and the total amount representing all of the elements is between 0 wt % and 0.3 wt %, β type hardening of the blank at a given diameter, such that the titanium of the niobium-based alloy is essentially in the form of a solid solution with niobium in β phase, and a content of titanium in α phase is 5 vol % or less, and performing at least one deformation of the blank alternating with at least one heat treatment, wherein the number of heat treatments and of deformations is limited so that the blank obtained retains a structure in which the titanium of the niobium-based alloy is essentially in the form of a solid solution with niobium in β phase, the content of titanium in α phase is 5 vol % or less and the niobium-based alloy has an elastic limit of at least 600 MPa and an elastic modulus of 100 GPa or less, and before the last heat treatment carrying out winding to form the spiral spring.

7. The method according to claim 6, wherein the at least one deformation comprises wiredrawing and/or rolling.

8. The method according to claim 7, wherein the last deformation applied to the blank is rolling.

9. The method according to claim 6, comprising a single deformation with a degree of deformation between 1 and 5.

10. The method according to claim 6, wherein a degree of deformation is between 2 and 5.

11. The method according to claim 6, wherein a total degree of deformation, the number of heat treatments and parameters of the heat treatments are selected to obtain a spiral spring having a thermoelastic coefficient about 0.

12. The method according to claim 6, comprising, after the β-type hardening, deformation, winding and heat treatment.

13. The method according to claim 12, comprising more than one heat treatments.

14. The method of manufacture according to claim 6, wherein the β-type hardening is a solution treatment having a duration between 5 minutes and 2 hours at a temperature between 700° C. and 1000° C., under vacuum, followed by cooling under gas.

15. The method of manufacture according to claim 6, wherein one of the at least one heat treatment is carried out for a time between 1 hour and 15 hours at a temperature between 350° C. and 700° C.

16. The method of manufacture according to claim 15, wherein one of the at least one heat treatment is carried out for a time between 5 hours and 10 hours at a temperature of between 350° C. and 600° C.

17. The method of manufacture according to claim 15, wherein one of the at least one heat treatment is carried out for a time between 3 hours and 6 hours at a temperature of between 400° C. and 500° C.

18. The method of manufacture according to claim 6, comprising, before the at least one deformation, depositing, on the blank, a surface layer of a ductile material selected from the group consisting of copper, nickel, cupro-nickel, cupro-manganese, gold, silver, nickel-phosphorus Ni—P and nickel-boron Ni—B, to facilitate forming in the form of wire, and, after the at least one deformation and before the winding, removing the surface layer of the ductile material.

* * * * *